United States Patent [19]

Bacque et al.

[11] Patent Number: 4,992,523

[45] Date of Patent: Feb. 12, 1991

[54] COPOLYMERS CONTAINING SI-N AND SI-SI BONDS, POLYCARBOSILAZANES OBTAINED BY PYROLYSIS OF THE SAID COPOLYMERS, AND USE OF THE SAID POLYCARBOSILAZANES FOR THE PREPARATION OF SILICON CARBONITRIDE

[75] Inventors: Eric Bacque, Talence; Jean-Paul Pillot, Cestas; Jacques Dunogues, Talence; Pierre Olry, Bordeaux, all of France

[73] Assignee: Societe Europeenne de Propulsion, Suresnes, France

[21] Appl. No.: 204,677

[22] Filed: Jun. 9, 1988

[30] Foreign Application Priority Data

Jun. 10, 1987 [FR] France .................... 87 08091

[51] Int. Cl.$^5$ .......................................... C08G 77/26
[52] U.S. Cl. ............................. 528/034; 528/14; 528/32; 528/33; 528/38; 556/412; 556/430; 501/88
[58] Field of Search ............... 556/412, 430; 528/14, 528/38, 33, 34, 32; 501/88

[56] References Cited

U.S. PATENT DOCUMENTS

| | | | |
|---|---|---|---|
| 3,853,567 | 12/1974 | Verbeek ............... | 106/44 |
| 3,892,583 | 7/1975 | Winter et al. ......... | 106/55 |
| 4,340,619 | 7/1982 | Gaul .................... | 427/228 |
| 4,540,803 | 9/1985 | Cannady ............... | 556/412 |
| 4,612,383 | 9/1986 | Laine ................... | 556/412 |
| 4,656,300 | 4/1987 | Lebrun ................. | 556/412 |
| 4,745,205 | 5/1988 | Haluska ................ | 556/412 |
| 4,767,831 | 8/1988 | Bartos .................. | 525/474 |
| 4,800,221 | 1/1989 | Marko .................. | 528/10 |

FOREIGN PATENT DOCUMENTS

| | | |
|---|---|---|
| 0161751 | 11/1985 | European Pat. Off. . |
| 0208972 | 1/1987 | European Pat. Off. . |
| 0212485 | 3/1987 | European Pat. Off. ......... 528/14 |
| 3717450 | 12/1987 | Fed. Rep. of Germany ....... 528/14 |

*Primary Examiner*—John C. Bleutge
*Assistant Examiner*—Ralph H. Dean, Jr.
*Attorney, Agent, or Firm*—Weingarten, Schurgin, Gagnebin & Hayes

[57] ABSTRACT

The present invention relates to copolymers containing —Si—N— and —Si—Si— bonds, which are obtained by the polycondensation of
at least one silane of the formula $RR_1SiCl_2$
and at least one disilazane of the formula

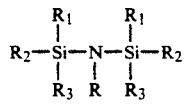

in which formulae:
$R_2$ is a halogen atom, preferably Br and Cl, and
R, $R_1$ and $R_3$, which are identical or different, represent a hydrogen atom or an alkyl, alkenyl, alkynyl, cycloalkyl, cycloalkenyl, aryl, alkylaryl or alkenylaryl hydrocarbon radical which may be functional,
to a process for the preparation of the said copolymers,
to the polycarbosilazanes obtained by thermolysis of the said copolymers and to the silicon carbonitrides obtained by heating the said polycarbosilazanes.

9 Claims, No Drawings

COPOLYMERS CONTAINING SI-N AND SI-SI BONDS, POLYCARBOSILAZANES OBTAINED BY PYROLYSIS OF THE SAID COPOLYMERS, AND USE OF THE SAID POLYCARBOSILAZANES FOR THE PREPARATION OF SILICON CARBONITRIDE

The present invention relates to copolymers containing —Si—N— and —Si—Si— bonds, which are obtained by the polycondensation of
at least one silane of the formula $$RR_1SiCl_2 \quad (A)$$

and at least one disilazane of the formula

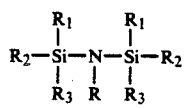
(B)

on which formulae:

$R_2$ Is a halogen atom, preferably Br and Cl, and

R, $R_1$ and $R_3$, which are identical or different, represent a hydrogen atom or an alkyl, alkenyl, alkynyl, cycloalkyl, cycloalkenyl, aryl, alkylaryl or alkenylaryl hydrocarbon radical which may be functional.

The proportions of A and B in the copolymer are unrestricted.

The copolymers according to the invention contain, in their main chain, $\{Si-Si-Si\}$ sequences originating from monomer (B), $\{Si-Si\}_n$ sequences, where $n \geqq 1$, originating from monomer (A), and $\{Si-(Si)-_n-Si-N\}$ sequences, where $n \geqq 1$, originating from the linking of both monomers.

It will be noted that, when at least one of the radicals R, $R_1$ and $R_3$ is hydrogen, the copolymer obtained contains an Si—H bond, which makes it possible subsequently to carry out chemical or thermal cross-linking reactions on the product.

Among the most valuable copolymers, there may be mentioned the products in which $R_2$=Cl, $R_1$=$R_3$=CH$_3$ and R=H; these products form a particularly important sub-family because, to prepare the said copolymers, it is necessary to use only [(CH$_3$)$_3$Cl—Si]$_2$NH, CH$_3$HSiCl$_2$ and (CH$_3$)$_2$SiCl$_2$, which are commercial products and basic products for the synthesis of silicones.

Thus a chlorinated disilane of the formula $Cl_xSiMe_{3-x}$—$SiMe_{3-y}Cl_y$, in which $1<x<3$ and $1<y<3$, may be used as the silane Mixtures of chlorinated disilanes, such as those recovered in the industrial synthesis of chlorosilanes, may also be used.

One property of the polysilane-polysilazanes claimed in the present invention is the possibility afforded by these products of effecting the thermal conversion of

linkages to

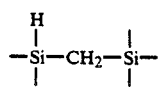

linkages (c.f., for example, S. JAMIMA, Ceram. Bull. 1983, 62, 893 and references cited therein). The polycarbosilazanes obtained are not only novel but can also be obtained in forms which are soluble, fusible without degradation under an inert atmosphere, spinnable, crosslinkable and with Si/C/N ratios which can vary within very wide limits.

These novel polycarbosilazanes are obtained by thermolysis of the copolymers at temperatures between 250° and 500° C. under an inert atmosphere; these polycarbosilazanes are excellent precursors for the production of matrices and fibers of silicon carbonitride, this silicon carbonitride being obtained by heating the polycarbosilazanes to temperatures of about 900°-1000° C. If these polycarbosilazanes have been produced according to the invention under a dry inert atmosphere, they contain no oxygen (or very little) provided a non-oxygenated solvent has been used in the copolymer formation step.

The process for the preparation of the copolymers according to the invention consists in bringing the co-monomers together in chosen proportions in a solvent medium, in the presence of an alkali metal, more particularly sodium. The solvent (or solvent mixture) which can be used may be toluene, xylene, a high-molecular alkane, a mixture of toluene and tetrahydrofuran, etc.

The copolymerization temperature is advantageously the boiling point of the solvent at atmospheric pressure.

The following Examples illustrate the invention:

EXAMPLE 1

In this Example as well as in those to follow, the dimethyldichlorosilane was distilled before being used. Likewise, the toluene was dried by azeotropic distillation and the THF was treated with sodium in the presence of benzophenone in order to remove traces of water and peroxides.

The equipment used to perform the reaction consists of a 500 ml round-bottomed flask provided with a magnetic stirrer, a pressure-equalized dropping funnel, an inlet for inert gas (argon or nitrogen) and a decalin-cooled reflux condenser connected to a drying column (CaCl$_2$). The solvent mixture, consisting of 21.75 g of THF and 152 29 g of toluene, i.e. a total of 200 ml in a ratio of 1/7 by weight, is introduced first, followed by 29 g of sodium (1.26 g atoms, 5% excess).

The solvent mixture is heated to the reflux temperature and the sodium is granulated by vigorous stirring. When the dispersion of molten sodium is sufficiently fine, the mixture of dimethyldichlorosilane (65.82%, 0.51 mol) and (HMeClSi)$_2$NH (15.67 g, 0.09 mol —15 mol %) is added dropwise.

It should be noted that, when the two chlorosilanes are mixed, a white turbidity appears which is probably due to a small amount of ammonium chloride As soon as the first few drops are added, the medium becomes turbid and pale blue. A deep blue color appears within a few minutes. Addition time: 2 h. After 24 h under reflux, the mixture is allowed to cool under an inert atmosphere and is filtered on a frit, in a glove box, under an inert atmosphere. This gives a clear colorless solution. The blue solid remaining is taken up with toluene and the mixture is then filtered, this operation being performed twice. The two filtrates obtained in this way are combined with the first and the whole is concentrated under reduced pressure to give a grayish-blue fluid grease; this is then devolatilized under 1 mm of mercury, at 100° C. for 90 min, with the aid of a short distillation column equipped with a rectifier.

After cooling, the product has the appearance of an opaque, grayish-blue solidified grease Weight obtained: 32.9 g (yield: 84.6%). The copolymer is soluble in solvents such as benzene, toluene, cyclohexane, heptane, carbon tetrachloride, ether, tetrahydrofuran etc.

It is characterized by physicochemical methods (IR, NMR) and ty GC. The blue solid is further subjected to methanolysis and then hydrolysis, yielding a white pasty solid. After washing with solvents (acetone, ether), the solid is dried under vacuum (1 mm Hg) overnight at 140° C. to give 5.1 g of insoluble solid.

EXAMPLE 2

The experiment is carried out as in Example 1 with 200 ml of toluene, and no THF, as the solvent This gives 0.53 g of low-molecular products, 28 1 g of soluble copolymer (yield: 72.1%) and 6.6 g of insoluble solid copolymer.

EXAMPLE 3

The experiment is carried out as in Example 1 with 175 ml of a toluene/THF mixture as the solvent (in the respective proportions of 7 to 1 by weight), 23 g of sodium (1 g atom), 41.1 g of $Me_2SiCl_2$ (0.318 mol) and 18.5 g of $(HClMeSi)_2NH$ (0.106 mol, 25 mol %). This gives 1.45 g of low-molecular products, 25.45 g of soluble copolymer in the form of a grease which becomes fluid at 100° C. (yield: 86.4%), and 1.4 g of insoluble solid copolymer.

EXAMPLE 4

The experiment is carried out as in Example 2 with 200 ml of toluene as the solvent, 25 g of sodium, 50.33 g of $Me_2SiCl_2$ (0.39 mol) and 22.64 g of freshly distilled $(HMeClSi)_2NH$ (0.13 mol, 25 mol %). This gives 0.95 g of low-molecular products, 29.2 g of soluble copolymer (yield: 81.1%) and 2.15 g of insoluble solid.

EXAMPLE 5

The experiment is carried out as in Example 2 with 250 ml of toluene as the solvent, 28.73 g of sodium (1.25 g atoms), 50.33 g of $Me_2SiCl_2$ (0.39 mol) and 36.6 g of $(HMeClSi)_2NH$ (0.21 mol, 35 mol %). This gives 1.05 g of low-molecular products, 40.52 g of soluble copolymer (yield 91.3%) (viscous oil) and 0.95 g of insoluble copolymer

EXAMPLE 6

The experiment is carried out as in Example 2 with 150 ml of toluene, 19.55 g of sodium (0.85 g atom), 25.81 g of $Me_2SiCl_2$ (0.2 mol) and 34.83 g of $(HMeSiCl)_2NH$ (0.2 mol, 50 mol %). This gives 0.15 g of low-molecular products, 25.55 g of copolymer (soluble fluid oil) (yield: 79.2%) and 0.35 g of insoluble material.

EXAMPLE 7

The experiment is carried out as in Example 2 with 125 ml of toluene, 19.3 g of sodium (0.84 g atom, 5% excess), 34.5 g of methyldichlorosilane (0.3 mol) and 17.4 g of $(ClMeHSi)_2NH$ (0.1 mol, 25 mol %). This gives 0.32 g of low-molecular products, 21.8 g of soluble copolymer (oil) (yield: 82.7%) and 1.5 g of insoluble copolymer.

EXAMPLE 8

The experiment is carried out as in Example 1 with 300 ml of a toluene/THF mixture in the respective proportions of 7 to 1 by weight, 32.2 g of sodium (1.4 g atoms), 79.94 g of freshly distilled dichloromethylvinylsilane (0.566 mol) and 17.42 g of $(HMeClSi)_2NH$ (0.1 mol, 15 mol %). This gives 12.77 g of soluble copolymer (solid) (yield: 23%) and 41.4 g of insoluble solid copolymer (yield: 77%).

EXAMPLE 9

The experiment is carried out as in Example 2 with 250 ml of toluene, 23 g of sodium (1 g atom), 50.78 g of dichloromethylvinylsilane (0.36 mol) and 20.9 g of $(HMeClSi)_2NH$ (0.12 mol, 25 mol %). This gives 17.95 g of soluble solid copolymer (yield: 43.4%) and 23.4 g of insoluble copolymer (56.6%).

EXAMPLE 10

The experiment is carried out as in Example 2 with 200 ml of toluene, 25.3 g of sodium (1.1 g atoms), 43.62 g of $Me_2SiCl_2$ (0.338 mol, 65 mol %), 7.33 g of dichloromethylvinylsilane (0.052 mol, 10 mol %) and 22.64 g of $(HMeClSi)_2NH$ (0.13 mol, 25 mol %). This gives 0.4 g of low-molecular products, 27.05 g of soluble copolymer (yield: 73.6%) in the form of fluid grease, and 8.8 g of insoluble solid copolymer.

EXAMPLE 11

The experiment is carried out as in Example 1 with 300 ml of toluene as the solvent, 21 g of sodium (0.91 g atom), 61.7 g of chlorinated disilanes of the empirical formula $Me_{2.3}Si_2Cl_{3.7}$ and 26.1 g of $(HMeClSi)_2NH$ (0 15 mol, 35 mol %). This gives 10.5 g of soluble copolymer (yield: 25.78%) and 23.3 g of insoluble copolymer (yield: 69.71%).

EXAMPLE 12

The experiment is carried out as in Example 2 with 125 ml of toluene, 16.1 g of sodium (0.7 g atom), 36.5 g of $Me_2SiCl_2$ (0.28 mol) and 9.41 g of $(HMeClSi)_2NMe$ (0.05 mol, 15 mol %). This gives 2.14 g of low-molecular products, 17.5 g of soluble copolymer (yield: 80.8%) and 3.27 g of insoluble solid.

Microanalysis of the soluble grease gives the following results: H (%): 9.65; N (%): 2.35; Cl (%): <0.2.

EXAMPLE 13

The experiment is carried out as in Example 2 with 125 ml of toluene, 16.1 g of sodium (0.7 g atom), 36.5 g of $Me_2SiCl_2$ (0.28 mol) and 10.1 g of $(EtHClSi)_2NH$ (0.05 mol, 15 mol %). This gives 1.07 g of low-molecular products, 16.98 g of soluble white grease (yield: 73.95%) and 2.62 g of insoluble solid.

Microanalysis of the soluble grease gives the following results H (%): 9.65; N (%): 3.42; Cl (%): 0.78.

EXAMPLE 14

The experiment is carried out as in Example 2 with 120 ml of toluene, 13.5 g of sodium (0.59 g atom), 27.1 g of $Me_2SiCl_2$ (0.21 mol) and 20.9 g of $(HPhClSi)_2NH$ (0.07 mol, 25 mol %). This gives 0.47 g of low-molecular products, 25.12 g of soluble copolymer (yield 89 3%) and 1.93 g of insoluble materials.

Microanalysis of the soluble grease gives the following results: H (%): 6.95; N (%): 4.33; Cl (%): 1.59.

EXAMPLE 15

The experiment is carried out as in Example 2 with 150 ml of toluene, 14.94 g of sodium (0.65 g atom), 48.74 g of PhMeSiCl$_2$ (0.255 mol) and 7.84 g of (HMeClSi)$_2$NH (0.045 mol, 15 mol %). This gives 0.09 g of low-molecular products, 34.54 g of soluble copolymer (yield: 99.3%) and 0.15 g of insoluble solid.

EXAMPLE 16

The experiment is carried out as in Example 2 with 160 ml of toluene, 16.1 g of sodium (0.7 g atom), 45.87 g of PhMeSiCl$_2$ (0.24 mol) and 13.93 g of (HMeClSi)$_2$NH (0.08 mol, 25 mol %). This gives 0.23 g of low-molecular products, 36.64 g of soluble copolymer and 0.13 g of insoluble materials.

EXAMPLE 17

The experiment is carried out as in Example 2 with 165 ml of toluene, 17.24 g of sodium (0.75 g atom), 37.3 g of Me$_2$SiCl$_2$ (0.289 mol) and 10.11 g of (HViClSi)$_2$NH (0.051 mol, 15 mol %). This gives 0.46 g of low-molecular products, 7.06 g of soluble grease (yield: 30.3%) and 18.27 g of insoluble materials.

The heat treatment (thermolysis) of the copolymers according to the invention is described in the following Examples.

EXAMPLE 18

The equipment consists of a 500 ml long-necked silica round-bottomed flask provided with a thermometer sleeve, an inlet for inert gas (argon) and a water-cooled silica reflux condenser connected to a precision gas meter. The soluble copolymer prepared according to Example 1 is introduced into the flask under an inert atmosphere (13.95 g), it being possible for the material to be weighed in a glove box, and the equipment is then purged carefully with argon.

Thermolysis is effected by progressively heating the flask to a temperature of 500° C. by means of a fluidized sand bath. The operation is stopped after 5 h, at which point the temperature of the reaction medium has reached 433° C. and the total volume of gas evolved is 1725 cm$^3$.

After subtraction of the dead volume of the equipment, the volume of gas is 104.6 cm$^3$/g, based on the mass of product used. The contents of the flask are taken up with 200 cm$^3$ of hexane, after cooling, and stirred for one hour with a magnetic stirrer until optimum dissolution has been achieved.

After filtration in a glove box, an insoluble solid is obtained which weighs 3.7 g after the solvent has been removed under vacuum. The filtrate is concentrated on a Rotavapor and then devolatilized for 1 h at 250° C. under 1 mm of mercury. 0.82 g of low-molecular products is then collected, together with 4.63 g of solid polycarbosilazane with a softening point of 210° C. on a Koffler bench (yield relative to the copolymer used: 33.2%). Proportion of residue at 900° C.: 64%.

Microanalysis of the soluble copolymer gives the following results: N (%): 3.2; Cl (%): <0.25.

EXAMPLE 19

The experiment is carried out as in Example 18 using the copolymer prepared in Example 1 (13.95 g). Duration: 5 h. Temperature of the sand bath: 500° C. Final temperature of the reaction medium 413° C. Volume of gas (calculated as previously): 82.4 cm$^3$/g.

Microanalysis of the soluble copolymer gives the following results: N (%): 4.5; Cl (%): <0.18.

Balance:

Low-molecular products: 1.76 g

Soluble polycarbosilazane: 5.4 g (yield: 38.7%); Softening point: 190° C.; proportion of residue at 900° C.: 66%;

Insoluble polycarbosilazane: 2.45 g;

EXAMPLE 20

The experiment is carried out as described in Example 18 using 12.8 g of copolymer prepared according to Example 2. Duration: 3 h 45 min. Temperature of the sand bath: 450° C. Final temperature of the reaction medium: 402° C.

$$\frac{\text{Volume of gas}}{\text{Mass of starting copolymer}} = 81.2 \text{ cm}^3/\text{g}$$

Balance

Low-molecular products: 2.1 g

Soluble polycarbosilazane: 6.7 g (yield: 52.3%); N (%): 3.72; Cl (%): 0.38; Softening point on Koffler bench 250° C.; Proportion of residue: 66% at 1400° C.;

Insoluble polycarbosilazane: 0.45 g

EXAMPLE 21

The experiment is carried out as described in Example 18 starting with 12.8 g of copolymer prepared according to Example 2. Duration: 4 h 30 min. Temperature of the sand bath: 425° C. Final temperature of the reaction medium: 390° C.

$$\frac{\text{Volume of gas}}{\text{Mass of starting copolymer}} = 70.3 \text{ cm}^3/\text{g}$$

Balance

Low-molecular products: 1.5 g

Soluble polycarbosilazane: 7.5 g (yield: 58.6%); N (%): 5.36; Cl (%): 0.50; Softening point on Koffler bench: 170° C.;

Insoluble material: 0.1 g

EXAMPLE 22

The experiment was carried out as described in Example 18 with 11.45 g of copolymer prepared according to Example 3. Duration of thermolysis: 50 min. Temperature of the sand bath: 325° C. Final temperature of the reaction medium: 322° C.

$$\frac{\text{Volume of gas}}{\text{Mass of starting copolymer}} = 63.7 \text{ cm}^3/\text{g}$$

Balance

Low-molecular products: 1.4 g

Soluble polycarbosilazane: 4.2 g (yield: 36.7%); N (%): 3.88; Cl (%): 0.28; Softening point: 20° C.;

Insoluble material: 4 g

EXAMPLE 23

The experiment is carried out as described in Example 18 with 11.9 g of copolymer prepared according to Example 3. Duration of thermolysis: 4 h. Temperature of the sand bath: 275° C. Final temperature of the reaction medium: 273° C.

$$\frac{\text{Volume evolved}}{\text{Mass of starting copolymer}} = 48.3 \text{ cm}^3/\text{g}$$

Balance

Low-molecular products: 1.15 g
Soluble polycarbosilazane: 4.35 g (yield: 36.5%); N (%): 3.37; Cl (%): <0.01; Softening point: 50° C.;
Insoluble material: 4.9 g

EXAMPLE 24

The experiment is carried out as described in Example 18 with 13.8 g of copolymer prepared according to Example 4. Duration of thermolysis: 4 h 45 min. Temperature of the sand bath: 400° C. Final temperature of the reaction medium: 376° C.

$$\frac{\text{Volume evolved}}{\text{Mass of starting copolymer}} = 69.9 \text{ cm}^3/\text{g}$$

Balance

Low-molecular products: 1.7 g
Soluble polycarbosilazane: 7.9 g (yield: 57.2%); Softening point: above 250° C.;
Insoluble material: 0.1 g

Example 25

The experiment is carried out as described in Example 18 with 13.95 g of copolymer prepared according to Example 4. Duration of thermolysis: 3 h 10 min. Temperature of the sand bath: 400° C. Final temperature of the reaction medium 374° C.

$$\frac{\text{Volume evolved}}{\text{Mass of starting copolymer}} = 55.2 \text{ cm}^3/\text{g}$$

Balance

Low-molecular products 1 1 g
Soluble polycarbosilazane: 9.3 g (yield: 66.7%); N (%): 4.62; Cl (%): 0.7; Softening point: 110° C.;
Insoluble material: 0.5 g

EXAMPLE 26

The experiment is carried out as described in Example 18 with 15 g of copolymer prepared according to Example 5. Duration of thermolysis: 4 h 30 min. Temperature of the sand bath: 400° C. Final temperature of the reaction medium 375° C.

$$\frac{\text{Volume evolved}}{\text{Mass of starting copolymer}} = 57 \text{ cm}^3/\text{g}$$

Balance

Low-molecular products: 0.6 g
Soluble polycarbosilazane 10.2 g (yield: 68%); Softening point: 135° C.;
Insoluble material: 0.1 g

EXAMPLE 27

The experiment is carried out as described in Example 18 starting with 15 g of copolymer prepared according to Example 5. DuratIon of thermolysis: 3 h min. Temperature of the sand bath: 400° C. Final temperature of the reaction medium: 373° C.

$$\frac{\text{Volume evolved}}{\text{Mass of starting copolymer}} = 65 \text{ cm}^3/\text{g}$$

Balance:

Low-molecular products 0 55 g
Soluble polycarbosilazane: 10 g (yield: 66.7%); Softening point: above 250° C.;
Insoluble material: 0.2 g Pyrolysis at 1200° C., under argon, of the soluble polycarbosilazane of this Example gave 72% of residue. The ceramic thus obtained is totally amorphous according to the X-ray spectrum After heating to 1600° C., it appears to be formed of SiC and $Si_3N_4$ microdomains according to photoelectron spectroscopy.

EXAMPLE 28

The experiment is carried out as described in Example 18 starting with 11 g of copolymer prepared according to Example 7. Duration of thermolysis: 5 h. Temperature of the sand bath: 350° C. Final temperature of the reaction medium: 328° C.

$$\frac{\text{Volume evolved}}{\text{Mass of starting copolymer}} = 36.3 \text{ cm}^3/\text{g}$$

Balance

Low-molecular products: 3.2 g
Soluble polycarbosilazane: 5.45 g (yield: 49.5%);
Softening point: 110° C.;
Insoluble material 0.5 g

What is claimed is:

1. Copolymers containing —Si—N— and —Si—Si— bonds, and having in their main chains $\{$-Si—Si—N$\}$- sequences, $\{$-Si—Si$\}_n$ sequences, and $\{$-Si—(Si)$_n$—Si—N$\}$ sequences wherein $n \geq 1$, said copolymers being obtained by the polycondensation of
   (a) at least one silane, at least one disilane, or a mixture of said disilanes; and silane having the formula $RR_1SiCl_2$; and said disilane having the formula $Cl_xSiMe_{3-x}$—$SiMe_{3-y}Cl_7$ in which $1 \leq x \leq 3$ and $1 \leq y \leq 3$; and
   (b) at least one disilazane of the formula

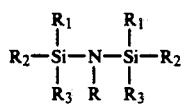

in which formulae:
   $R_2$ is a halogen atom, and
   R, $R_1$ and $R_3$, which are identical or different, are selected from the group consisting of a hydrogen atom, and alkyl, alkenyl, alkynyl, cycloalkyl, cycloalkenyl, aryl, alkylaryl, and alkenylaryl hydrocarbon radicals.

2. Copolymers according to claim 1 in which $R_2$=Cl, R=H and $R_1$=$R_3$=$CH_3$.

3. Copolymers according to claim 1 in which the material designated as (a) is a chlorinated disalane or a mixture of chlorinated disilanes.

4. Polycarbosilazanes which are obtained by thermolysis of a copolymer according to claim 1, between 250° and 550° C. under a dry inert atmosphere.

5. Silicon carbonitrides which are obtained by heating a polycarbosilazane according to claim 4, to a temperature of 900° to 1000° C. under an inert atmosphere.

6. Copolymers according to claim 2 in which the material designated as (a) is a chlorinated disilane or a mixture of chlorinated disilanes.

7. Polycarbosilazanes which are obtained by thermolysis of a copolymer according to claim 2, between 250° and 550° C. under a dry inert atmosphere.

8. Silicon carbonitrides which are obtained by heating a polycarbosilazane according to claim 7 to a temperature of 900° to 1000° C. under an inert atmosphere 9. A copolymer according to claim 1 wherein $R_2$ is Br or Cl.

* * * * *

UNITED STATES PATENT AND TRADEMARK OFFICE
CERTIFICATE OF CORRECTION

PATENT NO. : 4,992,523
DATED : February 12, 1991
INVENTOR(S) : Eric Bacque, et al.

It is certified that error appears in the above-identified patent and that said Letters Patent is hereby corrected as shown below:

Column 1, line 33, "{ Si-Si-Si }" should read --{ Si-Si-N } --.

Column 1, line 35, "n $\geq$ 1," should read --n $\geq$ 1,--.

Column 1, line 36, "n $\geq$ 1," should read --n $\geq$ 1,--.

Column 1, line 55, "silane Mixtures" should read --silane. Mixtures--.

Column 2, line 7, "JAMIMA" should read YAJIMA--.

Column 2, line 51, "152 29: should read --152.29--.

Column 3, line 10, "grease Weight" should read --grease. Weight--.

Column 3, line 15, "and ty GC." should read -- and by GC.--.

Column 3, line 23, "solvent This" should read --solvent. This--.

Column 3, line 24, "products, 28 1 g of soluble" should read --products, 28.1 g of soluble--.

Column 4, line 37-38, "NH(0 15 mol, 35 mol%)" should read --NH(0.15 mol, 35 mol%)--.

Column 4, line 67, "(yield 89 3%)" should read (yield 89.3%)--.

Column 7, line 48, "Low molecular products 1 1 g" should read --Low-molecular products; 1.1 g--.

UNITED STATES PATENT AND TRADEMARK OFFICE
CERTIFICATE OF CORRECTION

PATENT NO. : 4,992,523
DATED : February 12, 1991
INVENTOR(S) : Eric Bacque, et al.

It is certified that error appears in the above-identified patent and that said Letters Patent is hereby corrected as shown below:

Column 7, line 66, "polycarbosilazane 10.2" should read --polycarbosilazane: 10.2--.

Column 8, line 5, "3h min" should read --3h 25 min--.

Column 8, line 14, "products 0 55 g" should read --products: 0.55 g--.

Column 8, line 41, "material 0.5 g" should read --material: 0.5g--.

Column 8, line 48, "and silane having the" should read --said silane having the--.

Signed and Sealed this

Eighth Day of September, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,992,523

DATED : February 12, 1991

INVENTOR(S) : Eric Bacque, Jean-Paul Pillot, Jacques Dunogues, and Pierre Olry

It is certified that error appears in the above-identified patent and that said Letters Patent is hereby corrected as shown below:

In claim 1, column 8, line 51, "$Cl_xSiMe_{3-x}-SiMe_{3-y}Cl_7$" should read --$Cl_xSiMe_{3-x}-SiMe_{3-y}Cl_y$--.

Signed and Sealed this

Eighth Day of June, 1993

Attest:

MICHAEL K. KIRK

Attesting Officer

Acting Commissioner of Patents and Trademarks